3,285,950
UNSATURATED ESTERS OF CHRYSANTHEMUM
MONOCARBOXYLIC ACID
Joseph Weber, Paterson, N.J., assignor to Hoffmann-La
Roche Inc., Nutley, N.J., a corporation of New Jersey
No Drawing. Filed Oct. 2, 1963, Ser. No. 313,152
6 Claims. (Cl. 260—468)

This invention relates, in general, to a novel class of chemical compounds. More particularly, the invention relates to novel esters of chrysanthemum monocarboxylic acid; to methods for the production of such esters; and to the use of such esters as insecticides and miticides.

The novel compounds of this invention have the formula:

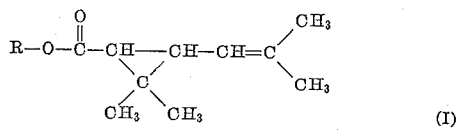

(I)

in which the symbol R is the hydrocarbon residue of an alcohol selected from the group consisting of (1) 3-methyl-4-[5-isopropenyl-2-methylcyclopenten-1-yl]-2-butanol
(2) 6,10-dimethylundeca-5,9-dien-2-ol
(3) 3,7-dimethyl-6-octen-1-yn-3-ol
(4) 3,7,11-trimethyldodeca-6,10-dien-1-yn-3-ol
(5) 3,7,11-trimethyldodeca-1,6,10-trien-3-ol
(6) 2-methyl-2-hepten-6-ol
(7) 5,6-dimethyl-5-hepten-2-ol
(8) 5-cyclohexylidene-2-pentanol
(9) 3-methyl-1-butyn-3-ol
(10) 3-methyl-1-buten-3-ol
(11) 3-ethyl-1-buten-3-ol
(12) 3-methyl-3-penten-1-ol
(13) 3,7,11,15-tetramethyl-1-hexadecyn-3-ol
(14) 3,7,11,15-tetramethyl-1-hexadecen-3-ol
(15) 3-methyl-1-penten-4-yn-3-ol
(16) 1,4-pentadien-3-ol Thus, broadly speaking, the present compounds are esters of dl-cis, trans-2,2-dimethyl-3-isobutenyl cyclopropane-1-carboxylic acid, the latter acid being referred to commonly as chrysanthemum monocarboxylic acid. In the paragraphs which follow hereinafter, the compounds of this invention will be designated simply as esters of chrysanthemum monocarboxylic acid. These compounds have been found to be useful as insecticides and miticides.

The compounds of Formula I, supra, are readily prepared. The process which is employed in the preferred embodiment of the invention involves the reaction of chrysanthemum monocarboxylic acid halide with one of the alcohols heretofore named, such reaction being carried out in the presence of an organic base and a solvent for the reactants. If desired, however, the compounds can be obtained by the reaction of chrysanthemum monocarboxylic acid, in the form of its anhydride, with the alcohol.

In the preferred embodiment of the invention, wherein a chrysanthemum monocarboxylic acid halide is employed, one can use, for example, chrysanthemum monocarboxylic acid chloride, chrysanthemum monocarboxylic acid bromide, etc. Because of its availability, chrysanthemum monocarboxylic acid chloride is preferably used. The ratio of chrysanthemum monocarboxylic acid halide to alcohol which is utilized in carrying out this invention is variable. The quantity of acid halide which is used should be at least stoichiometrically equivalent to the amount of alcohol employed. Preferably, however, an excess of the acid halide is used.

The organic base which is used in the preferred method serves to split off the hydrogen halide which is formed during the reaction. In general, any organic base which performs such function can be used. Suitable for use are organic bases such as pyridine, quinoline, dimethylaniline, etc. However, pyridine is employed as the organic base in the preferred embodiment of the invention.

As the solvent in the preferred method there can be used any inert aromatic or aliphatic hydrocarbon in which the reactants, that is, the chrysanthemum monocarboxylic acid halide and the alcohol, are soluble. These include, for example, benzene, toluene, hexane, heptane etc. However, benzene is preferably employed. The quantity of solvent which is used is not particularly critical. It is preferable, but not absolutely necessary, to employ a quantity of solvent which is sufficient to completely dissolve the reactants. Obviously, an excess of solvent, over and above that needed to dissolve the reactants, can be used, if desired.

The temperature at which the reaction described in the preceding paragraph is carried out will vary depending upon the nature of the alcohol in use. In general, the reaction is exothermic and, hence, upon mixing the reactants, an increase in temperature will be observed. Where a primary alcohol, that is, 3-methyl-3-penten-1-ol is used, or where there is in use a secondary alcohol which is saturated in the $\alpha,\beta$-position, that is, 3-methyl-4 - [5 - isopropenyl - 2 - methylcyclopenten - 1 - yl] - 2 - butanol; 2 - methyl - 2 - hepten - 6 - ol; 5,6 - dimethyl - 5 - hepten - 2 - ol; 6,10 - dimethylundeca - 5,9-dien - 2 - ol; or 5 - cyclohexylidene - 2 - pentanol, the reaction is allowed to proceed at ambient temperature, without any external heating. Where, however, a tertiary alcohol is in use, for example, 3-methyl-1-buten-3-ol; 3 - ethyl - 1 - buten - 3 - ol; 3,7,11,15 - tetramethyl-1 - hexadecen - 3 - ol; 3,7-dimethyl - 6 - octen - 1 - yn-3 - ol; 3,7,11 - trimethyldodeca - 6,10 - dien - 1 - yn-3 - ol; 3 - methyl - 1 - butyn - 3 - ol; 3,7,11,15 - tetramethyl - 1 - hexadecyn - 3 - ol and 3 - methyl - 1 - penten-4-yn-3-ol, or where there is in use a secondary alcohol which has ethylenic linkages at the $\alpha,\beta$-position, that is, 1,4-pentadien-3-ol, the reaction is carried out at the reflux temperature of the reaction mixture.

The manner in which the presently disclosed esters are worked up from the reaction mixture will be immediately apparent to persons skilled in the art. In one such procedure, after the compound is formed, the reaction mixture is quenched by pouring it into water. The mixture is stirred and, thereupon the aqueous layer and the organic solvent layer are separated. The aqueous layer is then extracted with a suitable solvent, ordinarily the same solvent used as the reaction medium, and the extracts combined with the separated organic solvent layer. The organic layer, including the extracts, is washed first with a suitable mineral acid, such as, dilute sulfuric acid, then with a solution of a suitable inorganic base, for example, a dilute aqueous solution of sodium bicarbonate and finally with water until the wash water is neutral in reaction. The organic solvent solution is subsequently dried and the solvent is removed in vacuo. The residue is then distilled to yield the desired ester in pure form.

The production of one of the esters disclosed herein involves an additional step which has not been previously mentioned. The ester in question is the 3,7,11-trimethyl-dodeca-1,6,10-trien-3-yl ester of chrysanthemum monocarboxylic acid. This ester is produced by the hydrogenation of the 3,7,11-trimethyldodeca-6,10-dien-1-yn-3-yl ester of chrysanthemum monocarboxylic acid. The latter compound is produced as described heretofore, that is, by the reaction of 3,7,11-trimethyldodeca-6,10-dien-1- yn-3-ol with chrysanthemum acid halide in the presence of an organic base and a solvent for the reactants.

The hydrogenation of the 3,7,11-trimethyldodeca-6,10-dien-1-yn-3-yl ester of chrysanthemum monocarboxylic acid to yield the 3,7,11-trimethyldodeca-1,6,10-trien-3-yl ester of acid can be carried out by any suitable and appropriate procedure. Preferably, the hydrogenation is effected, in a suitable organic solvent medium, using hydrogen and catalytic quantities of a Lindlar catalyst. The expression "Lindlar catalyst" is used herein to denote that class of catalysts disclosed by Lindlar in Helvetica Chimica Acta, 35, 446–450 (1952). A preferred Lindlar catalyst is the 5% palladium-on calcium carbonate catalyst modified by deposition of lead thereon, specifically disclosed by Lindlar at page 450 of the cited publication in Helvetica Chimica Acta. In this procedure, there can be used any organic solvent in which the starting ester is soluble and which is inert under the hydrogenation reaction conditions. Suitable for use are solvents, such as hexane, heptane, ethanol, methanol, etc. In the preferred embodiment of the invention, however, heptane is employed.

As indicated heretofore, the compounds of this invention are useful as insecticide and miticide agents. The compounds have been found to be effective as contact poisons against, for example, the pea aphid, Mexican bean beetles and against mites.

The manner in which the present compounds are used as insecticidal agents and miticidal agents will be readily apparent. In general, the compounds will be dissolved in an organic solvent of the type generally found in conventional insecticide and miticide preparations and such solution, with the aid of a suitable surface active agent, is subsequently dispersed in water. Such dispersion can be applied to the plants, foliage, animals, etc., to be protected by means of the use of a suitable spraying applicator. The dispersion can be embodied in a conventional aerosol container, if desired.

For a fuller understanding of the nature and objects of this invention, reference may be had to the following examples which are given as further illustrations of the invention and are not to be construed in a limiting sense.

*Example 1*

In this example, 128.0 grams (1.0 mole) of 2-methyl-2-hepten-6-ol, 170.0 ml. of pyridine and 750.0 ml. of benzene were charged into a vessel fitted with a stirrer, condenser and dropping funnel. The mixture was stirred, and while stirring continued, there was added, without external cooling, over a period of about thirty minutes, a solution of 206.5 grams (1.1 mole) of chrysanthemum acid chloride in 200 ml. of benzene. At the start of the addition, the temperature of the reaction mixture was about 22° C. When the addition of the chrysanthemum acid chloride was complete, the temperature of the reaction mixture was about 53° C. Stirring was continued for a period of one hour after all of the chrysanthemum acid chloride had been charged into the reaction mixture. At the end of that time, the temperature of the reaction mixture had fallen to about 29° C.

Thereafter, the reaction mixture was quenched by pouring it into 1.0 liter of water. The mixture was stirred in water for a period of about thirty minutes, following which the aqueous and organic solvent layers were separated. The aqueous layer was then extracted two times using 200 ml. of benzene each time. The separated organic solvent layer and the benzene extracts were combined and washed first three times with a total of 600 ml. of 10% sulfuric acid (w./w.), secondly three times with 900 ml. of 5% aqueous sodium bicarbonate solution and, lastly, six times with a total of 3.0 liter of water, at which time the wash water was neutral to Hydrion paper. The benzene solution was then dried over Drierite.

Subsequently, the solution was filtered to remove the drying agent and the solvent was removed, in vacuo using a water aspirator. The residue was then distilled to yield 208.0 grams (73% of theory) of 2-methyl-2-hepten-6-yl-dl-cis, trans-2,2-dimethyl-3-isobutenyl-1-cyclopropanecarboxylate, that is, the 2-methyl-2-hepten-6-yl ester of chrysanthemum monocarboxylic acid. This ester, a colorless liquid has a boiling point 98–99° C. at 0.09 mm.; $n_D^{25} = 1.4695$.

By the same procedure described in the immediately preceding paragraphs of this example, the following named esters were produced by reacting, at ambient temperature, the reactants hereinafter indicated.

(a) 3 - methyl - 4-[5-isopropenyl-2-methylcyclopenten-1 - yl]-2-butanyl-dl-cis, trans-2,2-dimethyl-3-isobutenyl-1-cyclopropanecarboxylate, a slightly viscous, pale yellow colored liquid, boiling point of 128° C. at 0.15 mm.; $n_D^{25} = 1.4882$, prepared from 3-methyl-4-[5-isopropenyl-2-methylcyclopenten-1-yl]-2-butanol and chrysanthemum monocarboxylic acid chloride.

(b) 6,10-dimethylundeca-5,9-dien-2-yl-dl-cis, trans-2,2-dimethyl-3-isobutenyl-1-cyclopropanecarboxylate, a pale yellow-colored liquid, boiling point of 130° C. at 0.15 mm.; $n_D^{25} = 1.4795$, prepared from 6,10-dimethylundeca-5,9-dien-2-ol and chrysanthemum monocarboxylic acid chloride.

(c) 5,6-dimethyl-5-hepten-2-yl-dl-cis, trans-2,2-dimethyl-3-isobutenyl-1-cyclopropanecarboxylate, a colorless liquid, boiling point of 99° C. at 0.04 mm.; $n_D^{25} = 1.4739$, prepared from 5,6-dimethyl-5-hepten-2-ol and chrysanthemum monocarboxylic acid chloride.

(d) 5 - cyclohexylidene - 2 - pentanyl-dl-cis, trans-2,2-dimethyl-3-isobutenyl-1-cyclopropanecarboxylate, a colorless liquid, boiling point of 122° C. at 0.13 mm.; $n_D^{25} = 1.4874$, prepared from 5-cyclohexylidene-2-pentanol and chrysanthemum monocarboxylic acid chloride.

*Example 2*

In this example, 42.0 grams (0.5 mole) of 3-methyl-1-butyn-3-ol, 95 ml. of pyridine and 300 ml. of benzene were introduced into a vessel fitted with a stirrer, condenser and dropping funnel. There was added to this mixture, a solution of 102.6 grams (.55 mole) of chrysanthhemum monocarboxylic acid chloride in 100 ml. of benzene. The reaction mixture was heated to reflux temperature and maintained at that temperature for a period of about 240 minutes.

At the end of that time, the reaction mixture was cooled to a temperature of about 25° C. and it was quenched by pouring it into about 1.0 liter of water. The aqueous mixture was stirred for about 30 minutes, following which the aqueous layer and the organic solvent layer were separated. Thereafter, the aqueous layer was extracted 2 times, using 100 ml. of benzene each time. The benzene extracts and the organic solvent layer were combined and washed, first, three times with a total of 450 ml. of 10% sulfuric acid (w./w.) then three times with a total of 450 ml. of 5% aqueous sodium bicarbonate solution and finally with a total of 450 ml. of water, at which time the wash water was neutral to Hydrion paper. The organic solvent solution was then dried over Drierite, following which it was filtered. The solvent was, thereafter, removed in vacuo, using a water aspirator, and the residue was distilled.

There was obtained 100.2 grams (85% of theory) of the 3 - methyl - 1 - butyn-3-yl-dl-cis, trans-2,2-dimethyl-3-isobutenyl-1-cyclopropanecarboxylate in the form of a colorless, slightly viscous liquid, having a boiling point of 78° C. at 0.10 mm.; $n_D^{25} = 1.4684$.

By the same procedure described in the immediately preceding paragraphs of this example, the following named esters were produced by reacting, at reflux temperature, the reactants hereinafter indicated:

(a) 3-methyl-1-buten-3-yl-dl-cis, trans-2,2-dimethyl-3-isobutenyl-1-cyclopropanecarboxylate, a colorless liquid, boiling point of 70° C. at 0.4 mm.; $n_D^{25} = 1.4649$, prepared from 3-methyl-1-buten-3-ol and chrysanthemum monocarboxylic acid chloride.

(b) 3-ethyl-1-buten - 3-yl-dl-cis, trans-2,2-dimethyl-3-isobutenyl-1-cyclopropanecarboxylate, a colorless liquid boiling point of 79° C. at 0.10 mm.; $n_D^{25}=1.4666$, prepared from 3-ethyl-1-buten-3-ol and chrysanthemum monocarboxylic acid chloride.

(c) 3,7,11,15 - tetramethyl - 1 - hexadecen - 3-yl-dl-cis, trans-2,2-dimethyl - 3-isobutenyl-1-cyclopropanecarboxylate, a pale yellow colored liquid, boiling point of 95° C. at 0.03 mm.; $n_D^{25}=1.4670$, prepared from 3,7,11,15-tetramethyl-1-hexadecen-3-ol and chrysanthemum monocarboxylic acid chloride.

(d) 3-methyl-1-penten-4-yn-3 - yl-dl-cis, trans-2,2-dimethyl-3-isobutenyl-1-cyclopropanecarboxylate, a colorless liquid, boiling point of 80°–81° C. at 0.1 mm.; $n_D^{25}=1.4783$, prepared from 3-methyl-1-penten-4-yn-3-ol and chrysanthemum monocarboxylic acid chloride.

(e) 1,4-pentadien-3-yl-dl-cis, trans-2-2-dimethyl-3-isobutenyl-1-cyclopropanecarboxylate, a coloreless liquid, boiling point of 83°–84° C. at 0.15 mm.; $n_D^{25}=1.4726$, prepared from 1,4-pentadien-3-ol and chrysanthemum monocarboxylic acid chloride.

(f) 3,7-dimethyl-6-octen-1-yn-3-yl-dl-cis, trans-2,2 - dimethyl-3-isobutenyl - 1-cyclopropanecarboxylate, a pale yellow colored liquid, boiling point of 117° C. at 0.10 mm.; $n_D^{25}=1.4805$, prepared from 3,7-dimethyl-6-octen-1-yn-3-ol and chrysanthemum monocarboxylic acid chloride.

(g) 3,7,11,15-tetramethyl-1-hexadecyn-3-ol ester of dl-cis, trans-2,2-dimethyl - 3-isobutenyl-1-cyclopropanecarboxylate, a pale yellow colored viscous liquid, boiling point of 171° C. at 0.17 mm.; $n_D^{25}=1.4698$, prepared from 3,7,11,15-tetramethyl-1-hexadecen-3-ol and chrysanthemum monocarboxylic acid chloride.

Example 3

(a) In this example, the 3,7,11-trimethyl-6,10-dodecadien-1-yn-3-yl-dl-cis, trans - 2,2-dimethyl-3-isobutenyl-1-cyclopropanecarboxylate was prepared, by the procedure described in Example 2, by reacting 3,7,11,-trimethyl-6-10-dodecadien-1-yn-3-ol with chrysanthemum monocarboxylic acid chloride. The ester which was thus formed, was a brown colored liquid having a boiling point of 154° C. at 0.20 mm.; $n_D^{25}=1.4907$.

(b) The 3,7,11-trimethyl - 6,10-dodecadien-1-yn-3-yl-dl-cis, trans-2,2-dimethyl-3-isobutenyl-1-cyclopropanecarboxylate, which was produced as described in the preceding paragraph, was used herein in the preparation of the 3,7,11 - trimethyl-1,6,10-dodecatrien-3-yl-dl-cis, trans-2,2-dimethyl-3-isobutenyl-cyclopropane-1-carboxylic acid.

In such preparation, 159.6 grams (0.53 mole) of the ester, produced in paragraph (a) of this example was mixed with 750 ml. of Skelly C and 10.0 grams of Lindlar catalyst. The mixture was stirred at room temperature and hydrogen was passed therein. The reduction was carried out at atmospheric pressure and it was continued until the uptake of hydrogen ceased.

Thereafter, the reaction mixture was filtered to remove the catalyst therefrom and the solvent was evaporated off. The residue was distilled to yield 146.0 grams (91% of theory) of the 3,7,11-trimethyl-1,6,10-dodecatrien-3-yl-dl-cis, trans-2,2-dimethyl-3-isobutenyl-1-cyclopropanecarboxylate, in the form of a yellow liquid having a boiling point of 138° C. at 0.10 mm.; $n_D^{25}=1.4885$.

Example 4

By the procedure described in Example 1, there was produced the 3-methyl-3-penten-1-yl-dl-cis, trans-2,2-dimethyl-3-isobutenyl-1-cyclopropanecarboxylate, a colorless liquid, boiling point of 77° C. at 0.03 mm.; $n_D^{25}=1.4670$, prepared from 3-methyl-3-penten-1-ol and chrysanthemum monocarboxylic acid chloride.

It is to be noted that the expression chrysanthemum monocarboxylic acid chloride is used in each of the preceding examples to denote the acid chloride of dl-cis, trans-2,2-dimethyl-3-isobutenylcyclopropane-1-carboxylic acid.

I claim:
1. Esters having the formula:

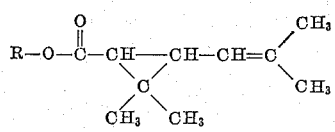

in which R is the hydrocarbon residue of an alcohol selected from the group consisting of
   (a) 3-methyl-4-[5-isopropenyl - 2 - methylcyclopenten-1-yl]-2-butanol
   (b) 6,10-dimethylundeca-5,9-dien-2-ol
   (c) 3,7-dimethyl-6-octen-1-yn-3-ol
   (d) 3,7,11-trimethyl-6,10-dodecadien-1-yn-3-ol
   (e) 3,7,11-trimethyl-1,6,10-dodecatrien-3-ol
   (f) 2-methyl-2-hepten-6-ol
   (g) 5,6-dimethyl-5-hepten-2-ol
   (h) 5-cyclohexylidene-2-pentanol
   (i) 3-methyl-1-butyn-3-ol
   (j) 3-methyl-1-buten-3-ol
   (k) 3-ethyl-1-buten-3-ol
   (l) 3-methyl-3-penten-1-ol
   (m) 3,7,11,15-tetramethyl-1-hexadecyn-3-ol
   (n) 3,7,11,15-tetramethyl-1-hexadecen-3-ol
   (o) 3-methyl-1-penten-4-yn-3-ol
   (p) 1,4-pentadien-3-ol 2. 3-methyl-3-penten-1-yl-dl-cis, trans-2,2-dimethyl - 3-isobutenyl-1-cyclopropanecarboxylate.

3. 3-methyl-1-penten-4-yn-3-yl-dl-cis, trans-2,2-dimethyl-3-isobutenyl-1-cyclopropanecarboxylate.

4. 3,7-dimethyl-6-octen-1-yn -3 yl - dl - cis, trans - 2,2-dimethyl-3-isobutenyl-1-cyclopropanecarboxylate.

5. 3,7,11-trimethyldodeca-1,6,10-trien-3-yl-dl-cis, trans-2,2-dimethyl-3-isobutenyl-1-cyclopropanecarboxylate.

6. 3,7,11,15-tetramethyl-1-hexadecen-3-yl-dl-cis, trans-2,2-dimethyl-3-isobutenyl-1-cyclopropanecarboxylate.

References Cited by the Examiner
UNITED STATES PATENTS

| | | | |
|---|---|---|---|
| 2,797,237 | 6/1957 | Birbiglia et al. | 260—632 |
| 2,841,620 | 7/1958 | Colaianni et al. | 260—632 |
| 3,072,526 | 1/1963 | Butenandt et al. | 260—632 |

LORRAINE A. WEINBERGER, *Primary Examiner.*

R. K. JACKSON, *Assistant Examiner.*